(12) United States Patent
Morgan et al.

(10) Patent No.: US 8,926,739 B2
(45) Date of Patent: Jan. 6, 2015

(54) PORTABLE GAS SCRUBBER WITH SENSOR

(71) Applicants: Gary Morgan, North Wichita, KS (US); Henry B. Schur, Hallandale Beach, FL (US); Gus Martin, North Wichita, KS (US)

(72) Inventors: Gary Morgan, North Wichita, KS (US); Henry B. Schur, Hallandale Beach, FL (US); Gus Martin, North Wichita, KS (US)

( * ) Notice: Subject to any disclaimer, the term of this patent is extended or adjusted under 35 U.S.C. 154(b) by 117 days.

(21) Appl. No.: 13/649,341

(22) Filed: Oct. 11, 2012

(65) Prior Publication Data

US 2013/0092029 A1 Apr. 18, 2013

Related U.S. Application Data

(60) Provisional application No. 61/546,198, filed on Oct. 12, 2011.

(51) Int. Cl.
| | | |
|---|---|---|
| *B01D 53/02* | (2006.01) | |
| *B01D 53/30* | (2006.01) | |
| *E03F 5/08* | (2006.01) | |

(52) U.S. Cl.
CPC . *B01D 53/30* (2013.01); *E03F 5/08* (2013.01); *B01D 2257/90* (2013.01); *B01D 2259/455* (2013.01)
USPC .............................................. 96/111; 96/113

(58) Field of Classification Search
USPC .......... 96/111, 113, 121, 131, 132, 151; 95/8, 95/11, 19, 135, 136; 55/385.5, 471; 422/5, 422/120, 122
See application file for complete search history.

(56) References Cited

U.S. PATENT DOCUMENTS

| | | | | |
|---|---|---|---|---|
| 3,926,599 | A * | 12/1975 | Rudin et al. | 96/147 |
| 4,236,902 | A * | 12/1980 | Fricke | 96/137 |
| 4,252,547 | A * | 2/1981 | Johnson | 96/121 |
| 4,586,941 | A * | 5/1986 | Cooley | 96/147 |
| 4,604,110 | A * | 8/1986 | Frazier | 95/128 |
| 5,288,306 | A * | 2/1994 | Aibe et al. | 95/141 |
| 5,403,548 | A * | 4/1995 | Aibe et al. | 422/5 |
| 5,562,407 | A * | 10/1996 | Cielo | 415/121.2 |
| 5,846,274 | A * | 12/1998 | Smelser | 55/381 |
| 6,379,429 | B1 * | 4/2002 | Scranton, Jr. | 95/90 |
| 6,379,433 | B1 * | 4/2002 | Scranton, Jr. | 95/135 |
| 6,986,806 | B2 * | 1/2006 | Kvietok et al. | 96/132 |

FOREIGN PATENT DOCUMENTS

JP 8-246484 A * 9/1996

* cited by examiner

*Primary Examiner* — Frank Lawrence
(74) *Attorney, Agent, or Firm* — Robert M. Schwartz (57) ABSTRACT

This invention relates to a portable odor scrubber system that is inserted into a sewer manhole or lift station where vaporous odors are prone to escape into the external environment. The invention controls such odors which may be caused by hydrogen sulfide, ammonia, mercaptan and other vapors which smell bad and can pose a severe health hazard. The invention has an automatic gas sensor trigger mechanism to control a fan to pull the noxious fumes through a series of scrubbers and to discharge treated air into the environment. Scrubber units may be easily replaced as well as designated to treat different environmental conditions. The invention can also store and transmit gas data information to an offsite location to monitor conditions where the portable odor scrubber system is located.

16 Claims, 6 Drawing Sheets

FIG. 1

FIG.2A
(SECTION A-A OF FIG.2B)

FIG.3A
(SECTION B-B OF FIG.3B)

FIG.4A (SECTION C-C OF FIG.4B)

FIG.5

PORTABLE GAS SCRUBBER WITH SENSOR

RELATED APPLICATIONS, PRIORITY

This utility Non-provisional patent application claims priority from U.S. Provisional Patent Application Ser. No. 61/546,198 filed on Oct. 12, 2011.

FIELD OF INVENTION

This invention relates to gas scrubbers which aid in odor control. More specifically, a gas scrubber system is incorporated into a sewer manhole or lift station.

BACKGROUND OF THE INVENTION

In underground sewage and drainage tunnels, all types of waste, debris, fertilizers, and other matter become entrained in water and perhaps other fluids, causing them to decay. This decay of matter exudes gas, vapors and odors. In addition to the foul smell, some gases may be hazardous to health, while others may be flammable. Some of these gases include, but may not be limited to, hydrogen sulfide, carbon monoxide, mercaptan, ammonia, methane as well as the con-commitment exudate of decaying organic matter. Any type of particle, if small enough, will easily be airborne as well. These underground sewage and drainage tunnels are present in most if not all cities of any size, all over the world. The water and other fluids flow eventually to a water treatment plant where after comprehensive remediation, the water will be released back into the environment. All though the underground sewage and drainage tunnels are access points and other areas where workmen may have to gain access to the tunnels from the surface. These manhole covers and lift stations are ubiquitous.

The hydrogen sulfide, besides being a toxic gas, also act as a highly corrosive agent especially to concrete which is used to manufacture the sewage tunnels and the manhole access tunnels. By removing this gas, the lifetime of the sewage infrastructure would be increased which would bring savings to the municipalities and their agents which are tasked to maintain them.

The odorous gasses and fumes may also, if not treated, add to the carbon released into the atmosphere and contribute to climate change. The instant invention is designed to be placed down a manhole cover or other subterranean access point, and permit the remediation of the gasses, fumes, vapors and entrained particles, by employing a series of filters and scrubbers in series, removing the harmful gasses, fumes, vapors and entrained particles in a safe and environmentally friendly way.

SUMMARY OF THE INVENTION

The invention is directed to an air filtering scrubbing apparatus which may be placed down a manhole into a sewage system line. The apparatus includes a plurality of stacked filtration/scrubbing units, further connected to a fan unit, which in turn is connected to a power unit. A plurality of electrical, power, control and communication (SCADA) devices are incorporated therein. When the fan is activated, the contaminated air from the sewage system line is pulled up through the stacked filtration/scrubbing units removing unhealthy gasses and vapors, malodorous smells, and entrained fine particles. The fan may be selectively activated when a gas sensor indicates the concentration of specific gasses exceeds a certain preset limit. This permits the stacked filtration/scrubbing units to have an extended lifetime, therefore they will require less frequent replacement. After the contaminated air passes through the stacked filtration/scrubbing units, the remediated air is then pushed by the fan above ground, where it mixes with the air in the environment. The apparatus is supported above the manhole by any of a variety of means. The apparatus may transmit data to an off site monitoring station, which would inform the proper authorities of any maintenance or malfunction, when the filter/scrubber units should be changed, the state of the battery, and time data logging of when the scrubbing apparatus had been employed. The apparatus may be powered by conventional means or by solar/wind power. The apparatus prevents untreated sewage line air from contaminating the air in the environment. The present invention or embodiments thereof have application in manhole odor control, industrial odor control, waste water odor control, odor control for lift stations and odor control for pump stations. The term odor control also includes the removal of hazardous gasses, corrosive gasses, undesirable gasses, as well as the removal of particulates.

BRIEF DESCRIPTION OF THE DRAWINGS

Preferred embodiments of the invention will hereinafter be described with reference to the accompanying drawing in which:

FIG. 1 is a cut away side view of the portable odor scrubber system with sensor for use in conjunction with sewer manholes, lift station or the like.

FIG. 2A is a sectional view taken along line A-A from FIG. 2B of the stacked filtering and scrubbing elements which form a portion of the portable odor scrubber system with sensor for use in conjunction with sewer manholes, lift station or the like.

FIG. 2B is a bottom view of the portable odor scrubber system with sensor for use in conjunction with sewer manholes, lift station or the like.

FIG. 4B is a top view of the portable odor scrubber system with sensor for use in conjunction with sewer manholes, lift station or the like.

DETAILED DESCRIPTION OF THE PREFERRED EMBODIMENTS

Figure 1:
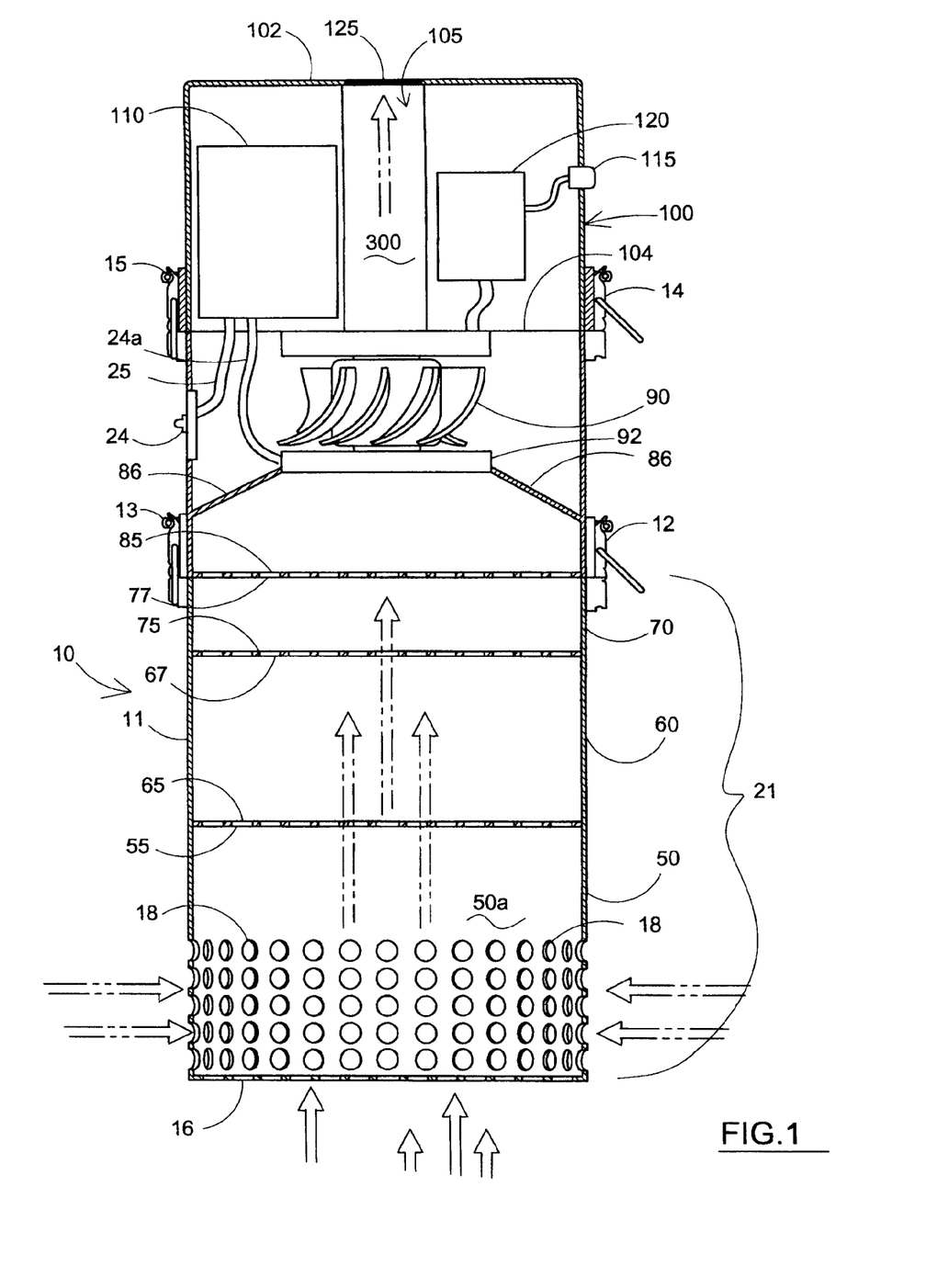

Referring now to FIG. 1, a side view of portable odor scrubber system 10 is shown. In one embodiment, the portable odor scrubber system 10 would be placed in the manhole as a substitution or addition to a modified manhole cover, so that vehicles and the like may pass over without damaging the invention. In a perspective view, the scrubber system would be cylindrical and have a rugged outer shell 11. The rugged outer shell 11 would be waterproof non-corrosive, and may be manufactured of any of a host of materials with such properties. One such material which may be employed for this function is stainless steel. The scrubber system 10 is a plurality of interconnected modules, each having a function or functions to perform. The portable odor scrubber system 10 is designed to fit in the aperture which is currently covered by a manhole cover or the like. The instant invention system 10 may also be employed in a lift station. From bottom to top of FIG. 1 are several interconnected modules. First, there are three filtration scrubbing modules, a first module 50, a second module 60 and a third module 70, and located above the third module 70 is a fan module 80 which creates a low pressure area which causes the gasses in the sewer to flow through the filtration scrubbing modules 21. The first module 50 has a plurality of gas or vapor inlet holes 18 located about the lower half of the cylindrical sidewall 50a. The bottom 16 of the first module 50 is circular and forms the bottom of the cylindrical sidewall 50a. The bottom 16 also has a plurality of gas or vapor inlet holes 18 (also referred to herein as outlet holes and exit holes), which will best be seen in FIG. 2B. The first module 50 is filled with filtering granules. These filtering granules (not shown) start the process of remediation of the air impregnated with sewage vapors and other noxious gas and entrained particulates. The top 55 of the first module 50 includes a plurality of exit holes 18 to allow the now partially treated sewage gas to enter the second module 60.

Located directly above the first module 50 is the second module 60. The second module 60 is also cylindrical and has the same diameter of the first module 50. The second module 60 also has a circular bottom 65 and includes a plurality of inlet holes 18 shown in FIG. 2C to allow the partially treated sewage gas to move upward by action of the fan 90 into the second module 60 for further treatment. The second module is filled with scrubbing beads. These scrubbing beads (not shown) continue the process of remediation of the air impregnated with sewage vapors and other noxious gas and entrained particulates. The top 67 of the second module 60 includes a plurality of exit holes 18 to allow the now further remediated sewage gas with more of the chemicals and adulterants which cause foul odors removed to enter the third module 70 again being pulled upwardly by the fan 90.

Located directly above the second module 60 is the third module 70. The third module 70 is also cylindrical and has the same diameter of the first module 50 and the second module 60. The third module 70 also has a circular bottom 75 and includes a plurality of inlet holes 18 to allow the further remediated sewage gas to move into the third module 60 for final treatment. The third module is filled with an oxidant. The oxidant (not shown) completes the process of remediation of the air impregnated with sewage vapors and other noxious gas and entrained particulates. The top 77 of the third module 70 includes a plurality of exit holes 18 to allow the completely treated sewage gas, which is considered clean enough to enter the environment, to enter the fan module 80.

The first filtration module 50, the second filtration module 60 and the third filtration module 70 are generally mounted in such an arrangement as shown, and may be referred to in total as the filtration modules 21. Although the three filtration modules described above have specific chemical and/or mechanical filter media specific for the anticipated gas(es) to be encountered, other chemical and or mechanical filter medial may be employed. The filter modules are interchangeable and are stackable to facilitate the use of multiple filters. Each of the filtration substances, granules, beads and the oxidant are housed in disposable cartridges that are stacked on one another within modules 21 and housed in rugged outer shell 11.

The fan module 80 is located on top 77 of the third module 70. The fan module 80 is also cylindrical and is attached to the combination of the first module 50, the second module 60 and the third module 70, by a pair of quick release attachment means, 12 and 13 respectively. Other means may be employed to attach the fan module 80 to the three filtration modules 21. The fan module 80 also has a circular bottom element 85 and a circular top element 87. The circular bottom element 85 also has a plurality of entry holes 18 to allow the now treated air to pass into the fan module 85. The lower portion of the fan module 80 has tapered walls 86 that taper upwardly toward the centrally disposed fan 90. At the bottom of the fan is a sensor for hydrogen sulfide 92. It is electrically connected to a sensor module 24, which includes a sensor electronics package and a programmable control module. The electrical power module 100 includes a battery 110, along with other power elements which will be discussed later. The battery 110 also powers the fan 90. When the fan 90 is activated it creates an area of low pressure at the top of the filtration modules 21 which causes a force to act on the air impregnated with sewage vapors and other noxious gas and entrained particulates. This force pulls the air impregnated with sewage vapors and other noxious gas and entrained particulates through the filtration modules 21, from the bottom 16, through the vapor inlet holes 18, through each of the scrubber modules, 50, 60 and 70, and out the top 77 causing the once noxious air to be remediated. The fan 90 may be a linear fan, but it is not limited to such. The fan 90 is mounted below the circular top element 87 of the fan module 80. The fan 90 mounting means is shown in more detail in FIGS. 3A, 3B and 3C.

The fan module 80 includes a pressure differential monometer meter, or other pressure differential monitoring unit, (best seen in FIG. 5) which may read, record and transmit the pressure differentials at each of, or through all of, the filtration modules 21. As the contaminated air becomes remediated, the filters and scrubbers become filled with the materials which are removed from the contaminated air. This would be detected by the pressure differential monometer as an increase in the pressure difference between one of, or all of the filtration modules 21. This indicates that one of, two of, or all of the filtration modules 21 will require replacement in order to maintain the efficiency of the filtration module(s) 21. Replacement of the modules is very easy, as they are held together by quick release attachment means 12 and 13. The portable odor scrubber system 10 may be pulled out of the manhole allowing access to the filtration modules 21 which are to be replaced. Once the quick release attachment means 12 and 13 are opened, the old filtration modules 21 are removed and replaced by a new set of filtration modules 21, and the quick release attachment means 12 and 13 would be closed securing the new filtration modules 21 on the portable odor scrubber system 10. The portable odor scrubber system 10 would then be placed back down the manhole. The replaced filtration modules 21 may be disposed of, recycled or refurbished for further use. It has further been considered possible that the filtration modules 21 may be replaced in situ, when such an operation is possible and advisable.

The portable odor scrubber system 10 may include "smart elements". These include the pressure differential monometer, sensors for detecting the chemical composition of the vapors, gasses, and entrained particles located in the sewer lines, sensors for detecting battery condition, sensors for detecting fan condition as well as a host of other devices. These would be connected to a sensor electronics package and a programmable control module. Additionally two-way communication between the portable odor scrubber system 10 and an off site monitoring station may be performed by SCADA or cellular phone systems. The acronym SCADA stands for Supervisory Control And Data Acquisition. The primary purpose of SCADA is to monitor and control a device or regional operating system from a central location. The present invention includes means to monitor any number of portable odor scrubbing systems 10.

The programmable control module includes a microprocessor and storage device for locally storing data generated by the sensors. The data generated may be transmitted to a receiver at a remote off site monitoring to allow remote supervision of the portable odor scrubber system 10, and allow rapid response to maintenance or other requirements.

Another aspect of the fan module 80 is the inter-connectivity between the sensors for detecting known harmful vapors, gasses, and entrained particles located in the sewer lines prior and during the passage of said contaminated air through the air filtration modules 21. If the contaminant composition sensors indicate that the air in the sewer lines no longer pose a hazard, or are no longer malodorous, the fan 90 will be turned off to save battery 110 life as well as the filtration modules 21 lifespan.

The power module 100 is also cylindrical, and a circular top 102 and circular bottom 104. The power module 100 is affixed to the top of the fan module 87 by another pair of quick release attachment means, 14 and 15 respectively. In the fan module 80 below the power module 100, the lower portion of the fan module tapers 86 upwardly toward the fan 90. The fan 90 evacuates the remediated air through an exhaust flute 105 which is a circular opening formed on the top of the fan 90 to the outside environment. The cylindrical exhaust flute 105 is centrally located in the power module 100. At the top of the exhaust flute 105 is a screen 125 which prevents materials from falling into the portable odor scrubber system 10. The arrangement of modules 50, 60, 70, 80 and 100 provides an air communication route from the sewer to the atmosphere. The fan 90 first pulls the untreated air through treatment modules 50, 60, 70 as described above, and then pushes the treated air out through the exhaust flute 105. The fan 90, the treatment modules 50, 60, 70, the center of the fan and the exhaust flute 105 form an air passageway 300.

The power module 100 includes a 6 Volt battery power source 110 which powers the fan 90, the hydrogen sulfide sensor 92, the sensor module 24 which further includes an electronics package and a programmable control module. A 110 volt AC inlet 115 is connected to a converter box 120 which acts to charge the battery 110. Although the battery 110 has been selected to be 6 volts, other batteries with different voltages may be employed to power the electrical systems, as different embodiments of the instant invention may have different power requirements. Additionally, different countries have different standard AC voltages and the instant invention has considered that the AC inlet may not be solely 110V but may be another voltage, and the converter box 120 would be modified to accommodate any AC voltage which may be utilized. It has further been considered that a solar panel may be mated with the portable odor scrubber system 10 to provide for recharging the battery 110 and to also power other systems which may be employed in different embodiments and applications of the invention. Both line power or external battery power may be also utilized to recharge the battery 110 or power the portable odor scrubber system 10. The interrelationship between the power systems, sensor systems and communication systems will be best seen in FIG. 5.

The portable odor scrubber system 10 includes a linear series of interlocking or inter-fitting cylindrical elements which would be placed down an uncovered manhole or other location, where it would be removably mounted by a bail, hanger, or other support or suspension means (not shown). This allows the portable odor scrubber system 10 to be portable and deployable at different locations depending on operational requirements. Other means to suspend the portable odor scrubber system 10 may be provided depending on the location which is desired to be treated. Under certain circumstances, the portable odor scrubber system 10 may be permanently mounted in the manhole using appropriate permanent mounting means.

One embodiment of the portable odor scrubbing system 10 is comprised of a series of interlocking or inter-fitting cylindrical modules as shown in FIG. 1. The portable odor scrubber system 10, however, under certain circumstances, be comprised of a series of interlocking square, rectangular or other geometrically shaped modules, which would allow for a greater diversity of applications.

Figure 2A:
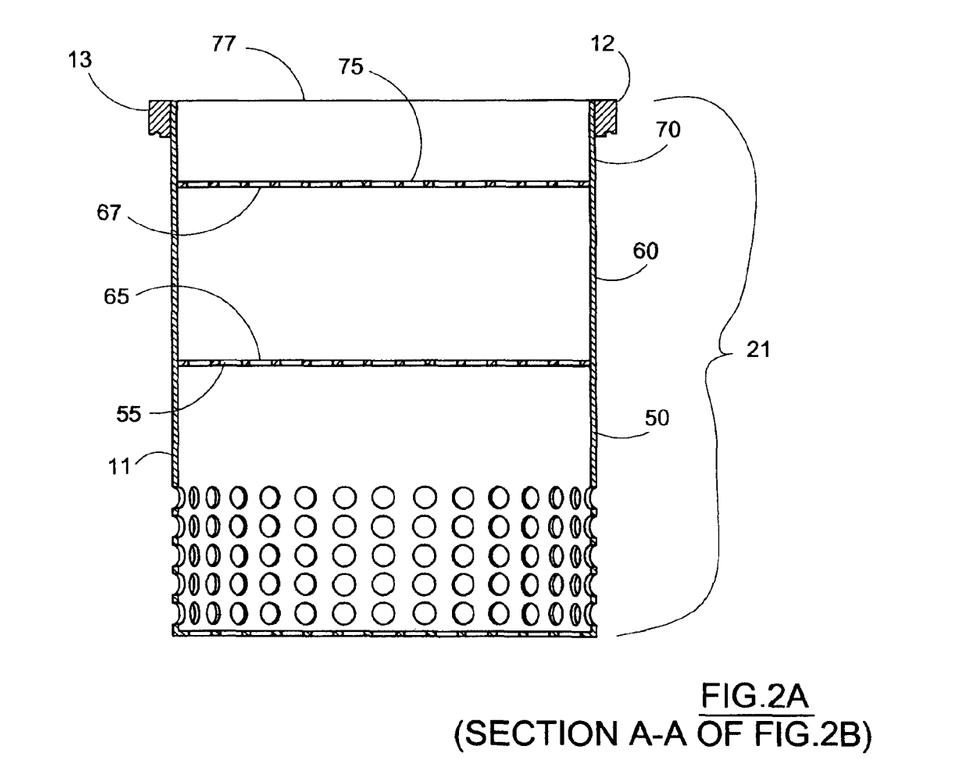

Referring now to FIG. 2A, a side view of the filtration modules 21 is shown. In this embodiment, there are three different filter/scrubbing modules shown in stacked relation. From the bottom to the top, they include a first module 50, a second module 60, and a third module 70.

The first module 50 has a sidewall 50a which includes a plurality of vapor inlet holes 18. The first module 50 also includes a bottom 16 (shown best in FIG. 2B) which also includes a plurality of vapor inlet holes 18. The first module 50 in this embodiment is filled with filtering granules. There exists a great deal of different filtering media which is well known. Although the first module 50 employs filtering granules as its filtering/scrubbing media, it is in no way solely limited to that media. The top 55 of the first module 50 interconnects with the bottom 65 of the second module 60.

The bottom 65 of the second module 60 is in fluid communication with the first module 50 about the top 55. This permits the air inducted into the filtration modules by the fan 90 to pass from the first module 50 to the second module 60. The second module 60 is filled with scrubbing beads. Although the second module 60 employs scrubbing beads as its filtering/scrubbing media, it is in no way limited to that media. The top 67 of the second module 60 interconnects with the bottom 75 of the third module 70.

The bottom 75 of the third module 70 is in fluid communication with the second module 60 about the top 67. This permits the air inducted into the filtration modules by the fan 90 to pass from the first module 50 to the second module 60 and then through the third module 70. The third module 70 is filled with an oxidant. Although the third module 70 employs an oxidant as its filtering/scrubbing media, it is in no way limited to that media. The top 77 of the third module 70 interconnects with the fan module 80. A portion of the quick connect elements 12 and 13 permit the rapid connection and disconnection of the filtration modules 21 to the fan module 80.

Figure 2B:
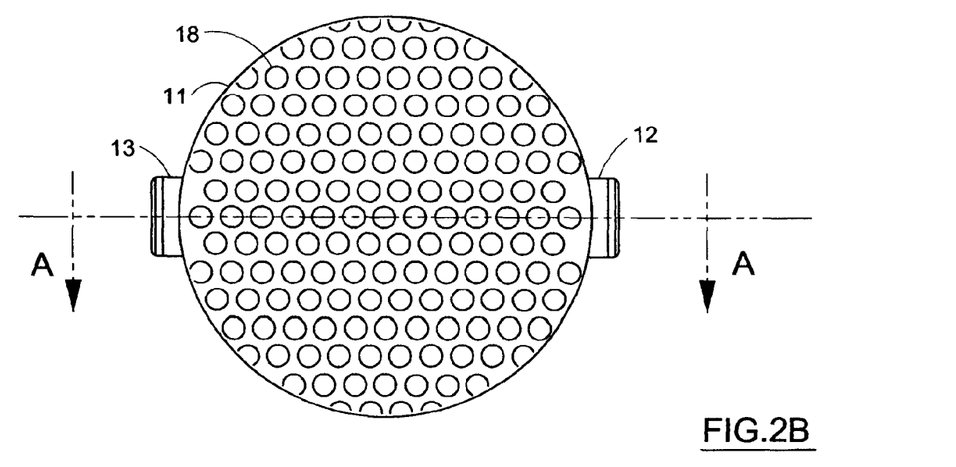
Figure 2C:
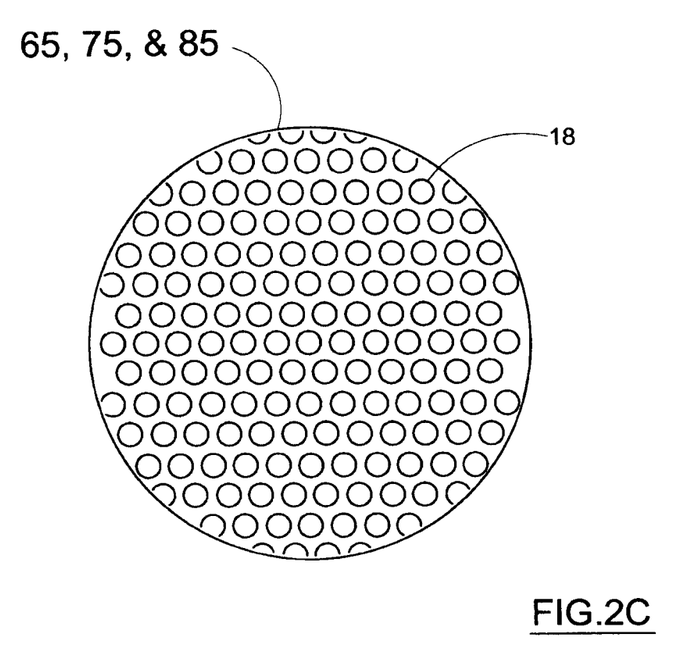
FIG. 2C is a view showing the detail of each of the circular bottoms 65, 75 and 85.

Referring now to FIG. 2B, a bottom view of the portable odor scrubber system 10 is shown. The bottom 16 of the portable odor scrubber system 10 is shown having a plurality of vapor inlet holes 18. The plurality of vapor inlet holes 18 will most likely be one of the elements of the portable odor scrubber system that will be most susceptible to corrosion. As such, these elements, as well as other corrosion susceptible elements may be coated with an anti-corrosive compound to increase their lifespan.

Figure 3A:
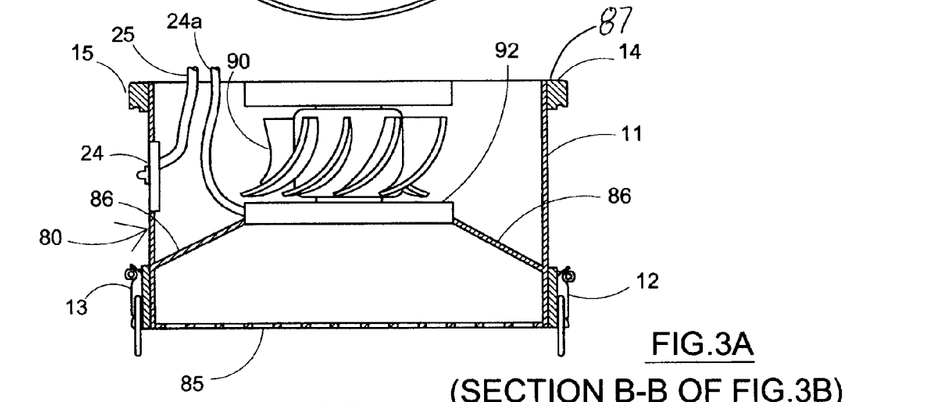
FIG. 3A is a sectional view taken along line B-B of FIG. 3B of the fan portion of the portable odor scrubber system with sensor for use in conjunction with sewer manholes, lift station or the like, showing the gas sensor, power supplies to both the fan and the sensor, as well as a tapered wall below the fan.
Figure 3B:
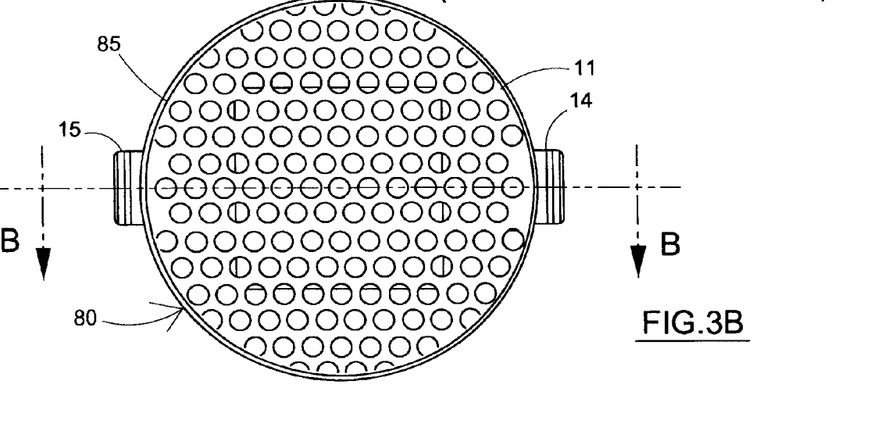
FIG. 3B is a bottom view of FIG. 3A.
Figure 3C:
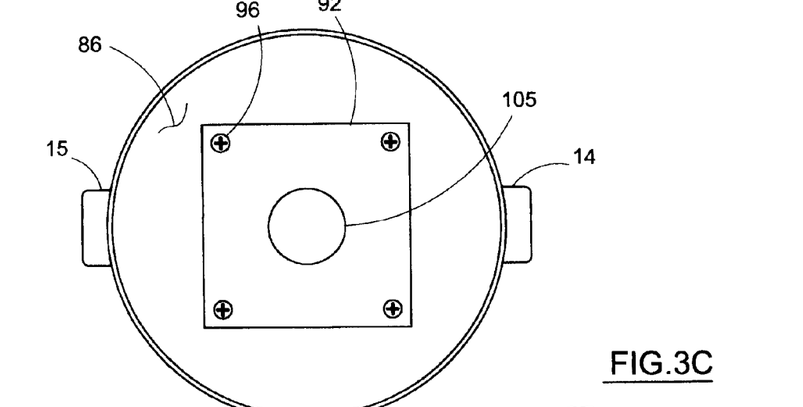
FIG. 3C is a top view of FIG. 3A.

FIGS. 3A, 3B and 3C show the fan module 80 located on top 77 of the third module 70. The fan module 80 is also cylindrical and is attached to the combination of the first module 50, the second module 60 and the third module 70, by a pair of quick release attachment means, 12 and 13 respectively. Other means may be employed to attach the fan module 80 to the three filtration modules 21. The fan module 80 also has a circular bottom element 85 and a circular top element 87. The circular bottom element 85 also has a plurality of entry holes 18 to allow the now treated air to pass into the fan module 85. The lower portion of the fan module 80 includes a tapered sidewall 86 which terminates proximal the centrally disposed fan 90. The fan 90 preferably runs on direct current provided by the battery 110 and may be comprised of plastic or other non-corrosive material. Alternatively or additionally, the fan 90 may be treated with an anti-corrosive agent to extend its lifetime. At the bottom of the fan is a sensor for hydrogen sulfide 92. It is electrically connected 24a to a sensor module 24, which includes a sensor electronics package and a programmable control module. The electrical power module 100 includes a battery 110, along with other power elements which will be discussed later. The battery 110 also powers the fan 90. When the fan 90 is activated it creates an area of low pressure at the top of the filtration modules 21 which causes a force to act on the air impregnated with sewage vapors and other noxious gas and entrained particulates. This force pulls the air impregnated with sewage vapors and other noxious gas and entrained particulates through the filtration modules 21, from the bottom 16, through the vapor inlet holes 18, through each of the scrubber modules, 50, 60 and 70, and out the top 77 of the filtration modules 21 causing the once noxious air to be remediated. The fan 90 may be a linear fan, but it is not limited to such. The fan 90 is mounted on the circular top element 87 of the fan module 80. The fan 90 mounting means is shown in more detail in FIG. 3A.

The fan module 80 includes a pressure differential monometer meter, or other pressure differential monitoring unit, (best seen in FIG. 5) which may read, record and transmit the pressure differentials at each of, or through all of, the filtration modules 21. As the contaminated air becomes remediated, the filters and scrubbers become filled with the materials which are removed from the contaminated air. This would be detected by the pressure differential monometer as an increase in the pressure difference between one of, or all of the filtration modules 21. This indicates that one of, two of, or all of the filtration modules 21 will require replacement in order to maintain the filtration module(s) 21 efficiency. Replacement of the modules is very easy, as they are held together by quick release attachment means 12 and 13. The portable odor scrubber system 10 may be pulled out of the manhole allowing access to the filtration modules 21 which are to be replaced. Once the quick release attachment means 12 and 13 are opened, the old filtration modules 21 are removed and replaced by a new set of filtration modules 21, and the quick release attachment means 12 and 13 would be closed securing the new filtration modules 21 on the portable odor scrubber system 10. The portable odor scrubber system 10 would then be placed back down the manhole. The replaced filtration modules 21 may be disposed of, recycled or refurbished for further use. It has further been considered possible that the filtration modules 21 may be replaced in situ, when such an operation is possible and advisable.

Referring now to FIG. 3A, the top 87 of the fan module 80 is shown. Fan 90 is shown affixed to the top 86 of fan module 80 by a plurality of mechanical fasteners 96. Other fastening means may be employed to secure the fan 90 in position. Centrally located through the fan 90 is an exhaust flute 105 through which the remediated air passes on its way to the surface environment. The sensor module 24 is connected to the hydrogen sulfide sensor 92 by connecting element 25. Connecting element 25 permits a signal to be sent from the hydrogen sulfide sensor 92 to the sensor module 24 when it detects the presence of a certain level of hydrogen sulfide gas. When the presence of hydrogen sulfide gas is detected above a certain preselected level, the fan 90 is automatically turned on until the levels of the gas return to a safe level.

Figure 4A:
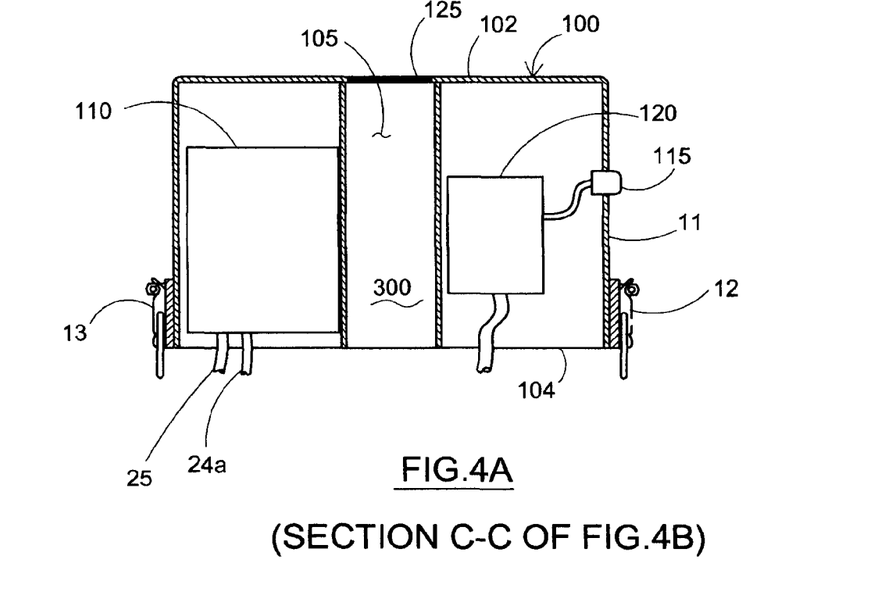
FIG. 4A is a sectional view taken along line C-C of FIG. 4B of the upper portion of the portable odor scrubber system with sensor for use in conjunction with sewer manholes, lift station or the like showing the power input, the power converter and the battery power source for powering the the fan to cause the scrubbed and filtered air to be removed through the exhaust flute.
Figure 4B:
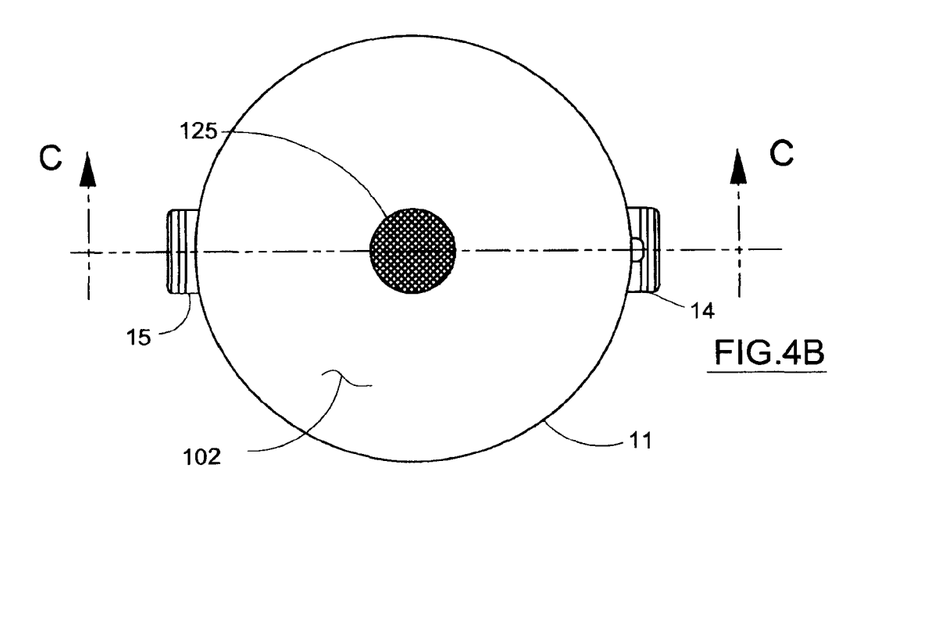

Referring now to FIGS. 4A and 4B, both a cut away side view and a top view of the power module 100 is shown respectfully. The power module 100 is also cylindrical, and a circular top 102 and circular bottom 104. The power module 100 is affixed to the top of the fan module 87 by another pair of quick release attachment means, 14 and 15 respectively. An exhaust flute 105 forms an air pathway directly from the exit of fan 90 to the outside environment. Covering the exhaust flute 105 on the top 102 is screen 125. An AC electrical inlet 115 is provided. The AC electrical inlet 115 is connected to a converter box 120. The converter box 120 converts alternating current to direct current and is used to recharge the battery 110. The battery 110 then would power the fan 90, the on-board sensors, microprocessor and control systems, data monitoring and storage systems, as well as a communication module which transmits sensor readings, data, and status of the modules and systems of the portable odor scrubber system 10 to a remote monitoring station. The communication module on the portable odor scrubber system 10 can also receive instructions, commands, and other interrogatory signals from the remote monitoring station. The interrogator signals would query the status of on-board sensors and systems. By use of the remote communication capability one may ascertain if the portable odor scrubber system 10 is functioning properly, requires maintenance of sensors or systems, replacement of filter modules as well as a host of other information. The portable odor scrubber system 10 would also have the capacity to contact the remote monitoring station should there be any functional difficulties with systems or sensors, filter replacement, or power difficulties.

Figure 5:
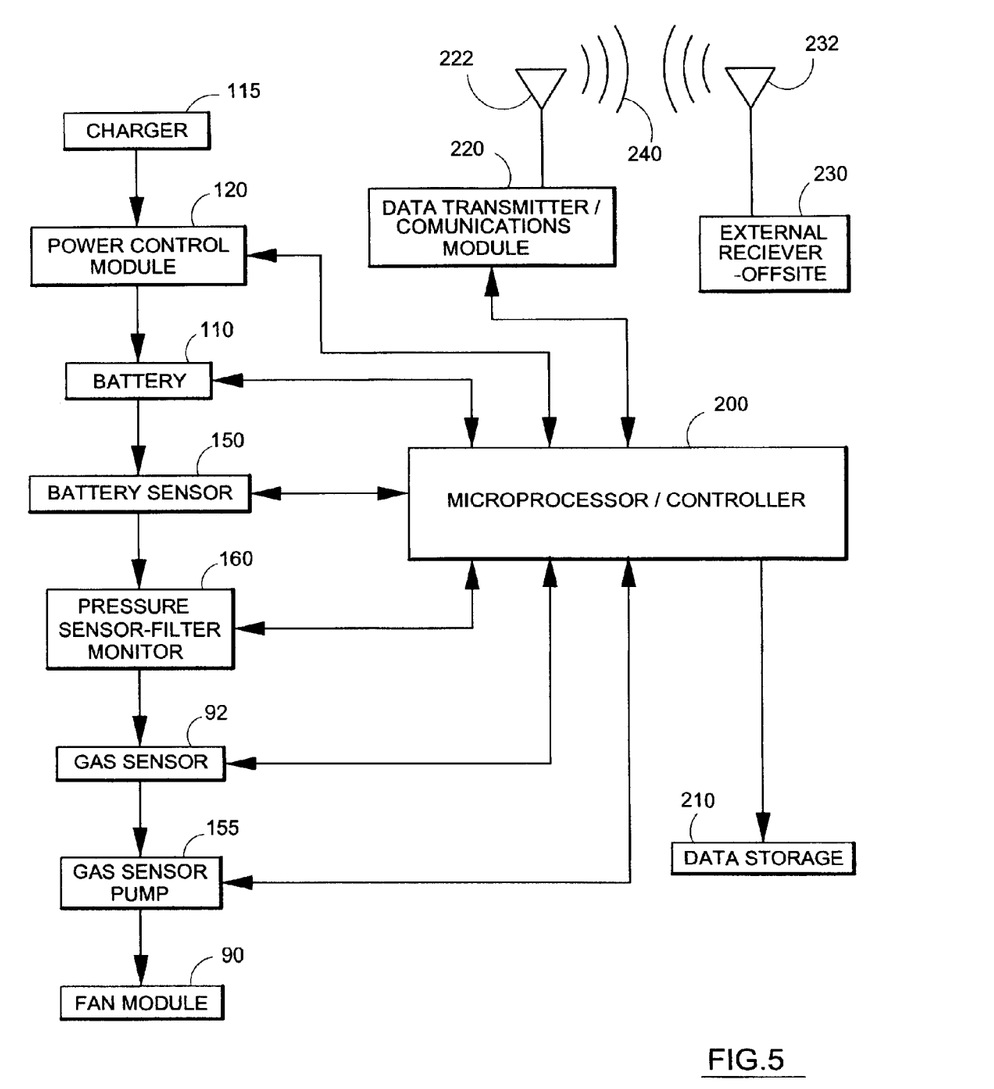
FIG. 5 is a block diagram showing the relationship of the power system, multiple sensors, sensor integration for fan control, data storage and logging and communication elements for communicating the status of multiple elements of the portable odor scrubbing system to an off site monitoring facility.

FIG. 5 is a block diagram of the control systems, communication systems, sensor systems and data storage systems of the portable odor scrubber system 10. The lines between each of the blocks of the diagram indicate inter-connection of the devices as well as the ability to communicate or send signals throughout the communication, control, sensors and other elements of the invention. The charger 115 is connected to the power converter module 120. This permits alternating current to be converted to direct current in order to charge the battery 110. In the case where a solar panel is deployed as an alternate power source, the battery 110 may be charged directly from the solar panel. A battery sensor 150 is provided to detect the condition and charge of the battery 110. If the charge of the battery 110 is running low, the controller 200 would command that the battery 110 be charged by the aforementioned systems, or communicate through data transmitter/transceiver 220 to a remote off site monitoring station 230 (which also includes a transmitter/transceiver) the portable odor scrubber system 10 requires battery 110 maintenance and could alert an appropriate authority to go on-site to repair or recharge the battery 110. A pressure sensor-filter monitor 160 is connected to the controller 200. The pressure sensor-filter monitor 160 may include a pressure differential monometer meter which would monitor the pressure differential from the entry to the exit of the combined air filtration modules 21. As the combined air filtration module 21 removes the contaminants from the contaminated air, they begin to lose their efficiency as the contaminants clog the path and exhaust the chemical scrubbing agents. Once the pressure differential reaches a preselected level, a signal will be sent to the controller 200, which would communicate this information through the data transmitter/transceiver 220 to the to a remote off site monitoring station 230 that the portable odor scrubber system 10 requires filter/scrubber module 21 maintenance or replacement and could alert an appropriate authority to go on-site to conduct such activities.

A gas sensor pump 155 obtains a sample of the downhole air which is passed to a gas sensor 92. The gas sensor 92 may detect hydrogen sulfide, or depending on the specific application, some other gas. When the gas sensor 92 detects gas above a preset value, the gas sensor 82 sends a signal to the controller 200 which would actuate the fan 90. At this point, due to the action of the fan 90, contaminated air is pulled up through the vent holes 18 at the bottom of the air filtration modules 21, and remediation of the contaminated air begins to take place. Once, the remediated air leaves the air filtration modules 21 it is exhausted through exhaust flute 105 to the outside environment. The gas sensor pump 155 will continue to sample the downhole contaminated air and if and when a point is reached, where the gas sensor 92 indicates that the level of contamination has is no longer above a preset value, a signal will be sent to the controller 200 to turn the fan 90 off. This has the advantage of not running the fan 90 continuously, increasing its duty life, as well as reducing the power requirements on the battery 110. By not continuously running the fan 90, the filter and scrubber media located internally in the air filtration monitors 21 may also have an increased lifespan. Other devices may be employed to sample the downhole contaminated gasses such as a solenoid valve or a air pump.

A data storage device 210 is also provided connected to the microprocessor/controller 200 and through that element to the rest of the control systems, communication systems, and sensor systems to permit logging of data which are generated by those systems for information gathering purposes.

The communications and data transmission element (transmitter/transceiver) 220 located on the portable odor scrubber system 10 is in communication by any wireless method 240 to an offsite transmitter/transceiver 230 and monitoring station. Data and signals may be sent from data transmission element (transmitter/transceiver) 220 to the offsite transmitter/transceiver 230 according to a preset schedule or when pre-programmed conditions are met in the controller of the portable odor scrubber system 10. Additionally, interrogatory signals may be sent from the offsite monitoring station to the portable odor scrubber system 10, inquiring as to the status of any of the systems which are being monitored by the plurality of sensors onboard. The data storage device 210 may store any salient information, time when the fan 90 is on or off, average time for filter/scrubber replacement and any of a variety of other metrics. This would enable the operators to predict when maintenance may need to be performed, especially on an odor scrubber system that remains in one location for a period of time.

It can clearly be seen in FIG. 5, that the charger 115, the power converter module 120, the battery 110, the battery sensor 160, the pressure sensor/filter monitor 160, the gas sensor 92, the gas sensor pump 155, the fan 90, the data storage 210, the microprocessor/controller 200 and the data transmitter/communications module 220, the data transmitter/communications module antenna 222, are all interconnected by one path or another, permitting signals to be sent from any of the above components to any other of the above components, the signals causing the any of the above elements to perform their function. Additionally, the offsite external transceiver 230 and the offsite external transceiver antenna 232 through any wireless method 240 possesses the same capabilities, except from a remote location.

It is to be understood that the preceding is merely a detailed description of the invention, and that alterations to the disclosed invention can be made in accordance with the disclosure without departing from the spirit and scope of the invention. The preceding description is not meant to limit the scope of the invention. The scope of the invention is to be determined by the appended claims and their equivalents.

We claim:

1. A device to be nested inside a manhole for removing harmful gas and odors entrained in air residing downhole comprising,
    a filter module having a filter module top and a filter module bottom, said filter module bottom having a plurality of apertures and a filtration media located intermediate said filter module top and said filter module bottom,
    a fan module having a fan module top and a fan module bottom, said fan module top having a fan centrally mounted thereon, said fan further having a center passage,
    a power module having a power module top and a power module bottom, said power module having a center passage,
    said power module bottom removably connected to said fan module top,
    and said fan module bottom removably connected to said filter module top, whereby
    when said fan is actuated, a pressure differential causes the harmful gas and odors to enter said filter module through said plurality of apertures, the harmful gas and odors are removed as they pass through said filter media cleaning the air, and the then cleaned air passes through said fan module center passage and further through the power module central passage, where the cleaned air exits into the environment.

2. A device to be nested inside a manhole for removing harmful gas and odors entrained in air residing downhole as claimed in claim 1, including a harmful gas detector, said harmful gas detector located downhole, said harmful gas detector able to detect the harmful gas in air at a preset level.

3. A device to be nested inside a manhole for removing harmful gas and odors entrained in air residing downhole as claimed in claim 2 wherein said harmful gas detector is connected to a controller, and said harmful gas detector is able to send a first signal to said controller when the harmful gas exceeds said preset level.

4. A device to be nested inside a manhole for removing harmful gas and odors entrained in air residing downhole as claimed in claim 3 wherein when said controller receives said first signal from said harmful gas detector that the harmful gas exceeds said preset level, said controller actuates said fan.

5. A device to be nested inside a manhole for removing harmful gas and odors entrained in air residing downhole as claimed in claim 4 wherein said harmful gas detector is able to send a second signal to said controller, said second signal indicating said harmful gas is below said preset level, and when said controller receives said second signal from said harmful gas detector, said controller de-actuates said fan.

6. A device to be nested inside a manhole for removing harmful gas and odors entrained in air residing downhole as claimed in claim 5 including a differential pressure sensor, said differential pressure sensor able to detect the difference in pressure between said filter module bottom and said filter module top.

7. A device to be nested inside a manhole for removing harmful gas and odors entrained in air residing downhole as claimed in claim 6 wherein said differential pressure sensor includes a second connection to said controller, and said differential pressure sensor is able to send a third signal to said controller when the differential pressure exceeds a second preset level.

8. A device to be nested inside a manhole for removing harmful gas and odors entrained in air residing downhole as claimed in claim 7 wherein when said controller is further connected to a first transceiver and when said controller receives said third signal from said differential pressure sensor, said controller actuates said first transceiver.

9. A device to be nested inside a manhole for removing harmful gas and odors entrained in air residing downhole as claimed in claim 8 wherein first transceiver is in communication with a second transceiver, said second transceiver is located at a location distant from said device.

10. A device to be nested inside a manhole for removing harmful gas and odors entrained in air residing downhole as claimed in claim 9 wherein when said first transceiver is actuated by said third signal, said first transceiver sends said second transceiver a fourth signal, said fourth signal indicating that said filter module needs replacement.

11. A device to be nested inside a manhole for removing harmful gas and odors entrained in air residing downhole as claimed in claim 10 including a battery, a battery sensor, and a battery recharger, said battery sensor connected to said battery and said controller, and said battery recharger connected to said battery, said battery sensor sends a fifth signal to said controller when said battery requires recharging, and said controller sends a sixth signal said battery recharger, actuating said battery recharger and recharging said battery.

12. A device to be nested inside a manhole for removing harmful gas and odors entrained in air residing downhole as claimed in claim 11 wherein said power module includes said battery recharger, said rechargeable battery, said rechargeable battery powers said fan, said differential pressure sensor, said battery sensor and said first transceiver.

13. A device to be nested inside a manhole for removing harmful gas and odors entrained in air residing downhole as claimed in claim 12 wherein said second transceiver sends said first transceiver interrogatory signal, said interrogatory signal interrogating said controller as to the current status of said device components selected from the group consisting of said controller, said battery, said battery sensor, said battery recharger, said first transceiver, said filtration media, said harmful gas detector, and said differential pressure sensor.

14. A device to be nested inside a manhole for removing harmful gas and odors entrained in air residing downhole including a fan module, a filter module, said filter module having filtration substances housed within disposable cartridges, an air pathway interconnecting said disposable cartridges and said fan module,
    said filter module having gas inlet holes integral with said air pathway,
    said air pathway having an exhaust flute,
    said device having a power module to power a fan in said air pathway of said fan module, a harmful gas detector, said harmful gas detector located downhole, said harmful gas detector able to detect the harmful gas in air at a preset level, said harmful gas detector causing said fan to actuate when the harmful gas exceeds said preset level, and said harmful gas detector further causing said fan to deactivate when the harmful gas goes below said preset level, whereby
    said fan creates a low pressure zone causing said harmful gas and odors to pass through said filtration substances removing said harmful gas and odors from the air and further causing the air to be exhausted into the environment through said air pathway.

15. A device to be nested inside a manhole for removing harmful gas and odors entrained in air residing downhole as claimed in claim 14 including a differential pressure sensor, said differential pressure sensor able to detect the difference in pressure between said filter module and said fan module.

16. A device to be nested inside a manhole for removing harmful gas and odors entrained in air residing downhole as claimed in claim 15 wherein when said differential pressure sensor detects a differential pressure between said filter module and said fan module which exceeds a preset pressure value, said differential pressure sensor causes a signal to be transmitted to a remote monitoring location, said signal indicating that said disposable cartridges need to be changed.

* * * * *